(12) United States Patent
Berto et al.

(10) Patent No.: US 6,865,030 B2
(45) Date of Patent: Mar. 8, 2005

(54) VARIABLE OPTICAL SLIT ASSEMBLY

(75) Inventors: Thomas E. Berto, Santa Rosa, CA (US); Scott A. Robertson, Sebastopol, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/458,948

(22) Filed: Jun. 11, 2003

(65) Prior Publication Data

US 2004/0252385 A1 Dec. 16, 2004

(51) Int. Cl.⁷ .............................. G02B 9/08; G03B 9/10; G21K 1/04
(52) U.S. Cl. ....................... 359/738; 359/739; 352/216; 378/153

(58) Field of Search ................................. 359/738, 739; 352/216, 214; 378/153

(56) References Cited

U.S. PATENT DOCUMENTS

| | | | | |
|---|---|---|---|---|
| 4,027,167 A | * | 5/1977 | Pollermann | 378/153 |
| 4,536,069 A | * | 8/1985 | Kunica | 396/501 |
| 5,150,149 A | * | 9/1992 | Alligood et al. | 396/242 |
| 6,585,429 B2 | * | 7/2003 | Yaginuma et al. | 396/458 |

* cited by examiner

*Primary Examiner*—Timothy Thompson

(57) ABSTRACT

One or more optical slits of a variable optical slit assembly limit the widths of optical beams propagating through the optical slits. A frame assembly of the variable optical slit assembly operatively couples one or more encoded translators to the optical slits. In operation, rotations of the encoded translators alter the widths and/or positions of the optical slits.

13 Claims, 13 Drawing Sheets

VARIABLE OPTICAL SLIT ASSEMBLY

FIELD OF THE INVENTION

The present invention generally relates to optical slits. More specifically, the present invention relates to a variable optical slit.

DESCRIPTION OF THE RELATED ART

Optical spectrum analyzers employ optical slits for setting optical resolution bandwidths. In order to vary the resolution bandwidth, optical spectrum analyzers must have an automated means for varying the width of the optical slit. Some drawbacks of prior art optical slits include (1) low resolution in the physical width of the optical slit, (2) high hysteresis in the adjustment of physical width of the slit, (3) high mechanical complexity, (4) non-automated operation, and (5) unstable operation of the optical slit within various operating ranges of environmental conditions like humidity and temperature. Therefore, there is a need for a new optical slit that eliminates as many as possible of the aforementioned drawbacks of the known optical slits.

SUMMARY OF THE INVENTION

The present invention advances the art by contributing a variable optical slit assembly constructed in accordance with various embodiments of the present invention. The variable optical slit assembly includes an optical slit that limits the width of any optical beam propagating through the optical slit. The variable optical slit assembly further includes a frame assembly operatively coupling one or more encoded translators to the optical slit. Any rotation of the encoded translator(s) alters either the width or the position of one or more optical slits.

Various features and advantages of the present invention will become further apparent from the following detailed description of the presently preferred embodiments, read in conjunction with the accompanying drawings. The detailed description and drawings are merely illustrative of the present invention rather than limiting the scope of the present invention being defined by the appended claims and equivalents thereof.

DETAILED DESCRIPTION OF THE EMBODIMENTS

Figure 1:
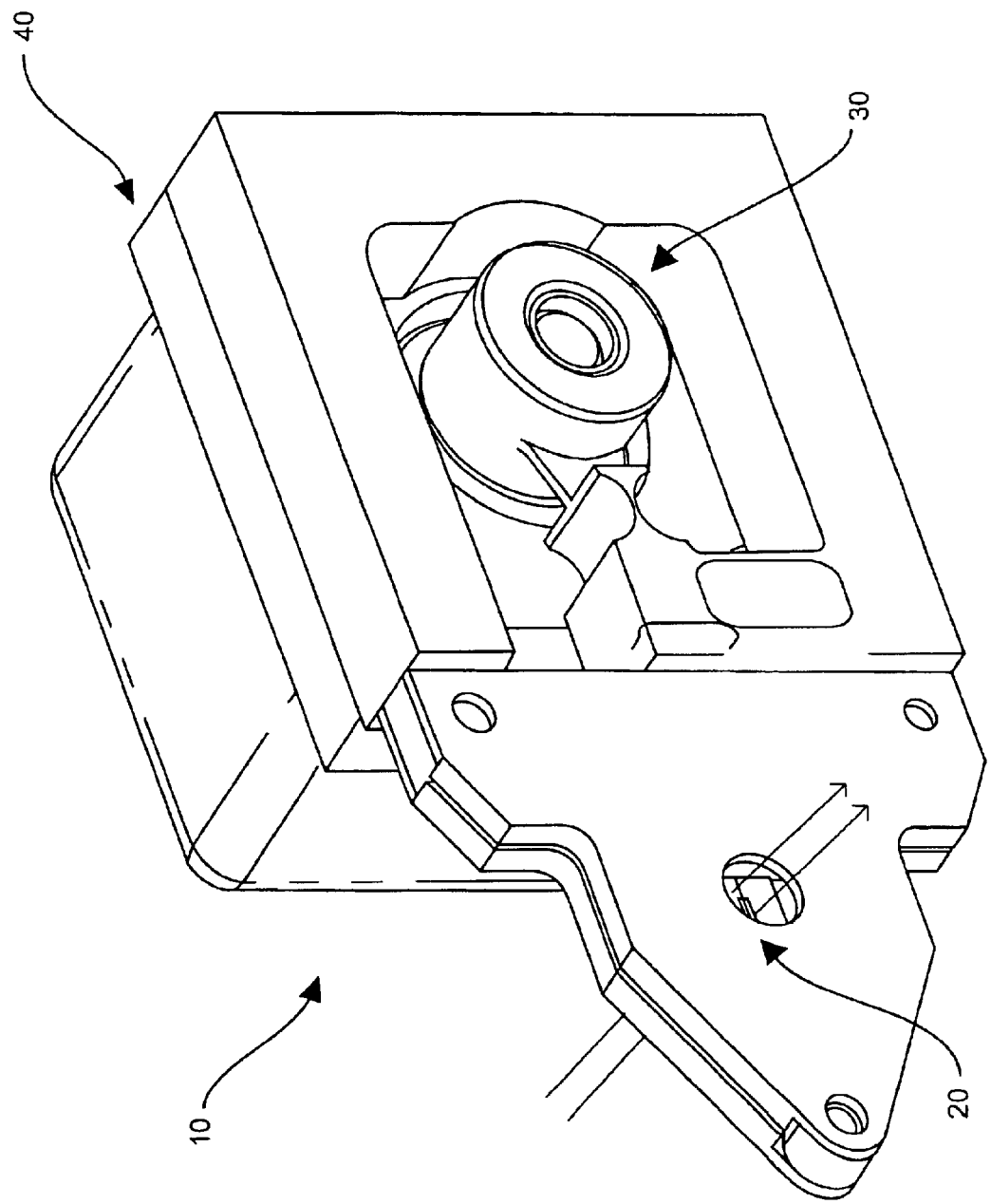
FIG. 1 illustrates a perspective view of a variable optical slit assembly constructed according to one embodiment of the present invention.

FIG. 1 illustrates a variable optical slit assembly 10 having an optical slit 20 that limits the width of an optical beam propagating through optical slit 20 as represented by the arrows. To alter the width of the optical slit 20, assembly 10 employs an encoded translator 30 including a shaft, an eccentric, a bearing assembly, and an encoded rotary actuator in accordance with a U.S. Pat. No. 6,414,785 B1 entitled "PRECISION POSITIONER FOR OPTICAL ELEMENTS" and issued Jul. 2, 2002, which is hereby incorporated by reference. A frame assembly 40 operatively couples encoded translator 30 to optical slit 20 whereby any rotation of encoded translator 30 alters the width of the optical slit 20.

The following FIGS. 2–10 illustrate seven (7) embodiments of frame assembly 40.

Each frame assembly illustrated in FIGS. 2–10 implements one or two techniques of the present invention for altering the width of the optical slit 20, or moving the optical slit 20 in response to a rotation of one or more encoded translators 30. The first technique involves an increase or a decrease in a width W of optical slit 20 that corresponds to the rotation of encoded translator(s) 30. The second technique involves a shifting of optical slit 20 that corresponds to the rotation of encoded translator(s) 30.

Figure 2:
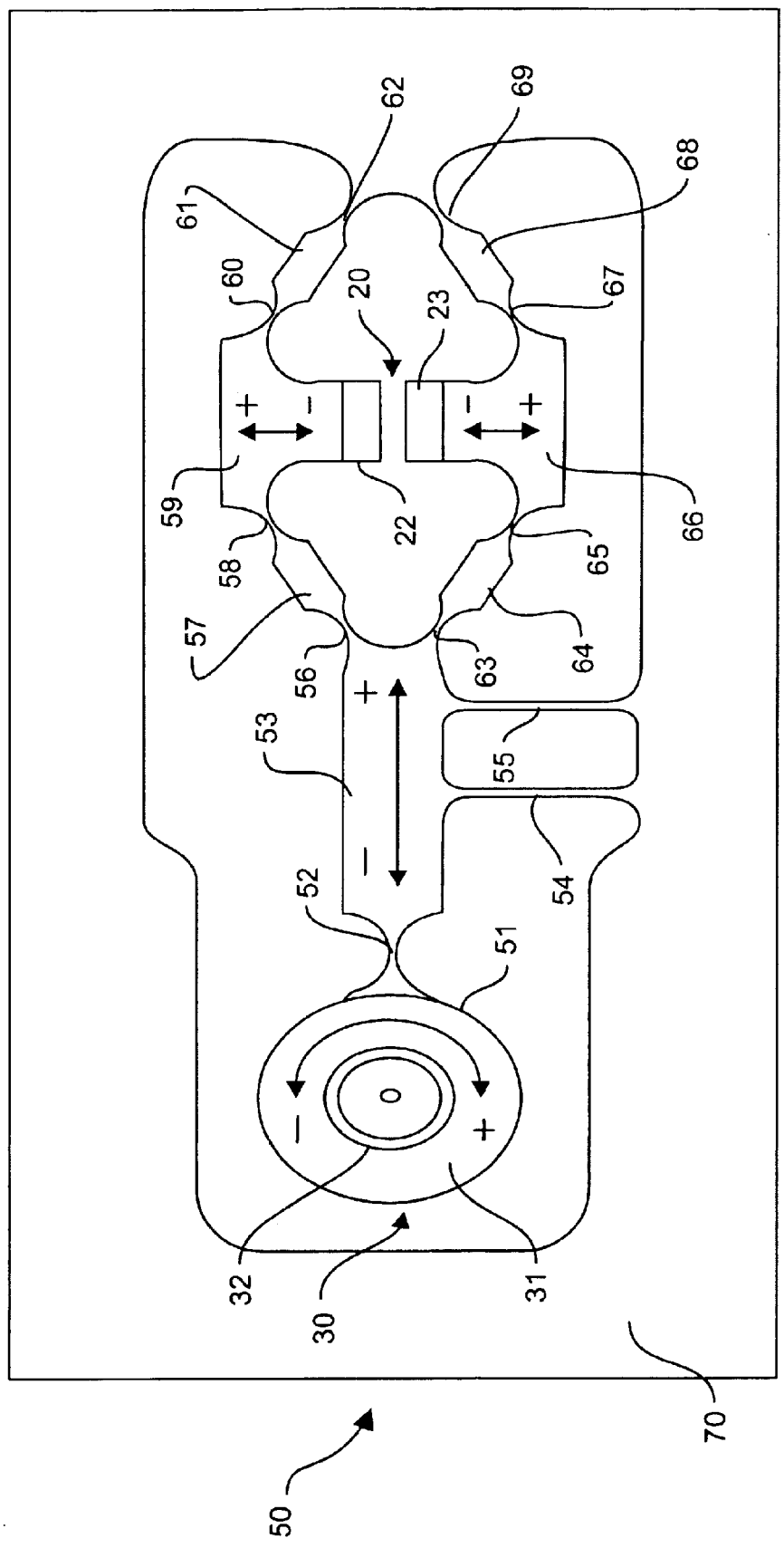
FIG. 2 illustrates a frame assembly constructed according to a first embodiment of the present invention.

FIG. 2 illustrates flexure frame assembly 50 having a bearing bore 51 conventionally receiving a bearing assembly 31 operatively coupled with encoded translator 30 as taught by U.S. Pat. No. 6,414,785 B1. Bearing assembly 31 is preloaded and glued to an eccentric 32 attached to encoded translator 30. A brushless DC motor (not shown) of encoded translator 30 controls a rotation of eccentric 32 in a positive (+) direction or a negative (−) direction. In one embodiment, a resolution of eccentric 32 approximates 1,000,000 counts per revolution of encoded translator 30.

Bearing bore 51 is connected to a connecting rod 53 via a right circular flexure 52. Connecting rod 53 is further connected to a frame 70 via a pair of guide flexures 54 and 55. A connecting rod 57 is connected to connecting rod 53 via a right circular flexure 56. A leg 59 is connected to connecting rod 57 via a right circular flexure 58. A connecting rod 61 is connected to leg 59 via a right circular flexure 60. Connecting rod 61 is further connected to frame 70 via a right circular flexure 62. A connecting rod 64 is connected to connecting rod 53 via a right circular flexure 63. A leg 66 is connected to connecting rod 64 via a right circular flexure 65. A connecting rod 68 is connected to leg 66 via a right circular flexure 67. Connecting rod 68 is further connected to frame 70 via a right circular flexure 69.

An upper knife-edge 22 is connected to leg 59, and a lower knife-edge 23 is connected to leg 66. Connecting rods 57 and 61 as well as leg 50 constitute an upper linkage structure for coupling knife-edge 22 to connecting rod 53. Connecting rods 65 and 67 as well as leg 66 constitute a lower linkage structure for coupling knife-edge 23 to connecting rod 53. A spatial positioning of knife-edges 22 and 23 constitutes a width of optical slit 20 (i.e., a distance between knife-edges. 22 and 23) for controlling the width of any optical beam propagating between knife-edges 22 and 23. The resolution of the width of optical slit 20 is a function of an eccentricity E of eccentric 32 as taught by U.S. Pat. No. 6,414,785 B1 as well as the angular resolution of encoded translator 30.

In operation, a rotation of eccentric 32 via the motor in a positive (+) direction translates connecting rod 53 in a positive (+) direction as guided by guide flexures 54 and 55, and translates knife edges 22 and 23 in positive (+) directions due to a compressing deformation of the upper and lower linkage structures. The result is an increase in the width of the optical slit as knife edges 22 and 23 are shifted away from each other.

Conversely, a rotation of eccentric 32 via the motor in a negative (−) direction translates connecting rod 53 in a negative (−) direction as guided by guide flexures 54 and 55, and translates knife edges 22 and 23 in negative (−) directions due to an extending deformation of the upper and lower linkage structures. The result is a decrease in the width of the optical slit as knife edges 22 and 23 are shifted toward each other.

The symmetrical nature of the increase and the decrease in the width of optical slit 20 is a function of the symmetrical nature of the upper and lower linkage structures relative to optical slit 20. Preferably, the upper and lower linkage structures are dimensioned to cause a symmetrical increase and a symmetrical decrease in the width of optical slit 20. In other embodiments, the upper and lower linkage structures may be dimensioned to cause a deliberate asymmetrical offset in the center of the slit, as the width is increased or decreased.

In an example, the knife-edges 22 and 23 are parallel, and should not be able to touch each other over the entire range of rotation of eccentric 32. Preferably, the upper and lower structures are dimensioned to make the installed knife-edges 22 and 23 parallel and not allow them to touch. In an embodiment, a manual tilt and/or position adjustment of knife-edges 22 and 23 can be implemented to make them more parallel, and to adjust the distance between them to prevent contact over the entire range of rotation of eccentric 32.

Figure 3:
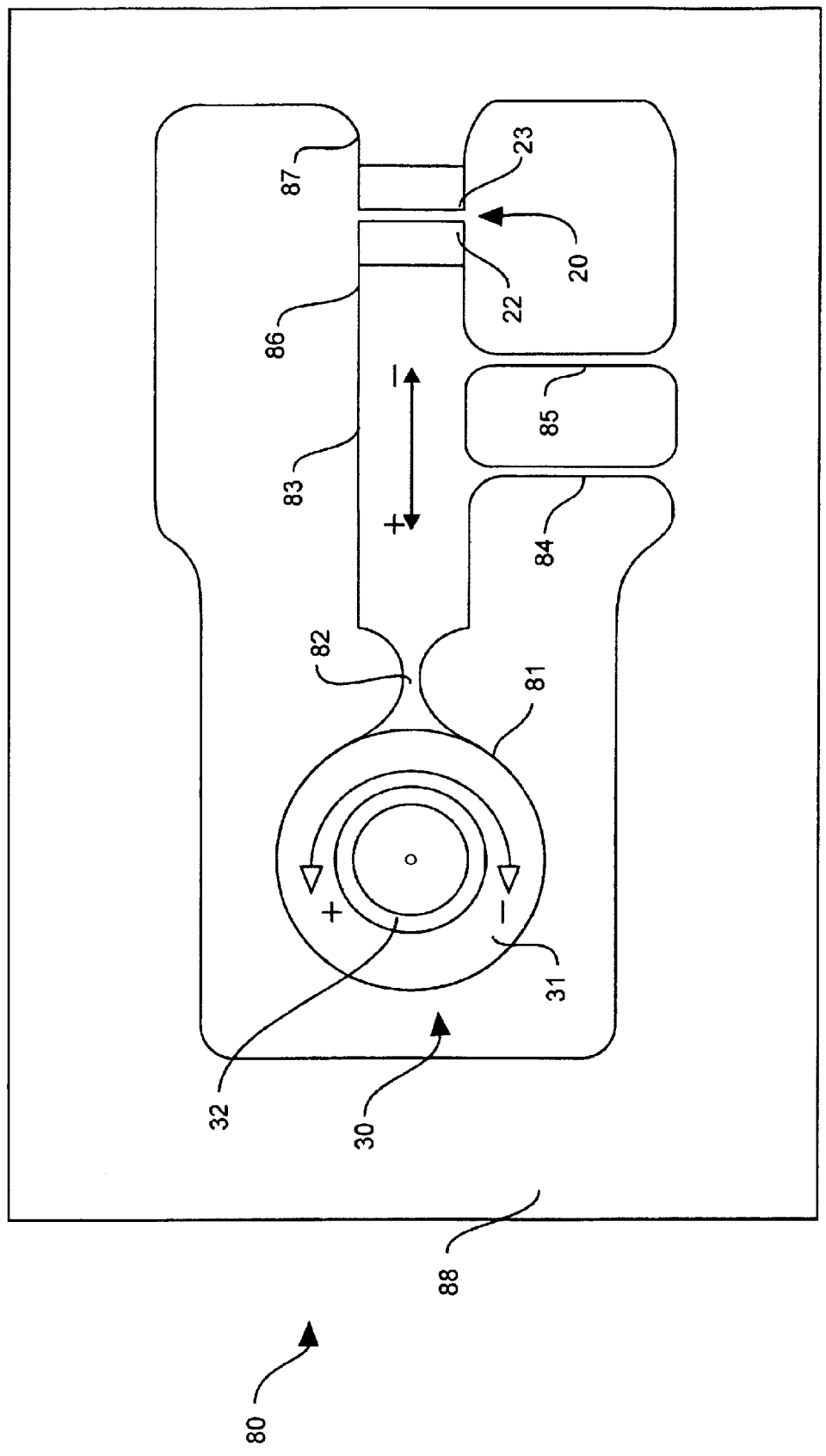
FIG. 3 illustrates a frame assembly constructed according to a second embodiment of the present invention.

FIG. 3 illustrates flexure frame assembly 80 having a bearing bore 81 conventionally receiving bearing assembly 31 of encoded translator 30. Bearing bore 81 is connected to a connecting rod 83 via a right circular flexure 82. Connecting rod 83 is further connected to a frame 88 via a pair of guide flexures 84 and 85. Knife-edge 22 is connected to a ledge 86 of connecting rod 83, and knife-edge 23 is connected to a ledge 87 extending from frame 88. Again spatial positioning of knife-edges 22 and 23 constitutes a width of optical slit 20 for defining the width of any optical beam propagating between knife-edges 22 and 23.

In operation, a rotation of eccentric 32 via the motor in a positive (+) direction translates connecting rod 83 in a positive (+) direction as guided by guide flexures 84 and 85, and translates knife-edge 22 in a positive (+) direction. The result is an increase in the width of the optical slit as knife-edge 22 is shifted away from knife-edge 23.

Conversely, a rotation of eccentric 32 via the motor in a negative (−) direction translates connecting rod 83 in a negative (−) direction as guided by guide flexures 84 and 85, and translates knife-edge 22 in the negative (−) direction. The result is a decrease in the width of the optical slit as knife-edge 22 is shifted toward knife-edge 23.

Figure 4:
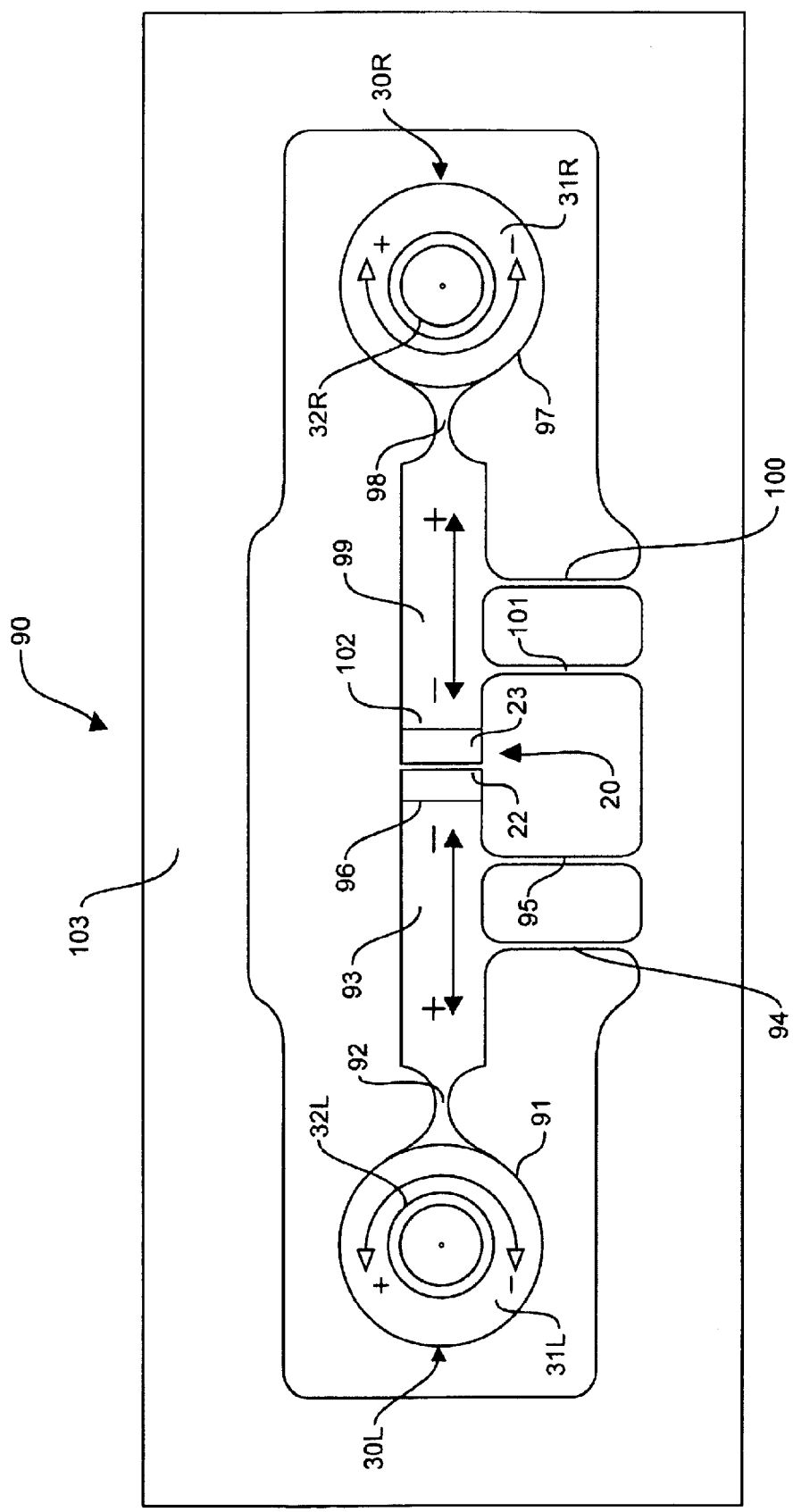
FIG. 4 illustrates a frame assembly constructed according to a third embodiment of the present invention.

FIG. 4 illustrates flexure frame assembly 90 having a bearing bore 91 conventionally receiving bearing assembly 31L operatively coupled with left-side encoded translator 30L. Bearing bore 91 is connected to a connecting rod 93 via a right circular flexure 92. Connecting rod 93 is further connected to a frame 103 via a pair of guide flexures 94 and 95. Knife-edge 22 is connected to a ledge 96 of connecting rod 93.

Flexure frame assembly 90 further has a bearing bore 97 conventionally receiving bearing assembly 31 operatively coupled with right-side encoded translator 30R. Bearing bore 97 is connected to a connecting rod 99 via a right circular flexure 98. Connecting rod 93 is further connected to a frame 103 via a pair of guide flexures 100 and 101. Knife-edge 23 is connected to a ledge 102 of connecting rod 99.

Again, a spatial positioning of knife-edges 22 and 23 constitutes a width of optical slit 20 for limiting the width of an optical beam propagating between knife-edges 22 and 23.

A first operation of frame assembly 90 involves, a rotation of both eccentrics 32L and 32R in the same direction. A rotation of both eccentrics 32L and 32R via the motor in a positive (+) direction translates connecting rod 93 in a positive (+) direction as guided by guide flexures 94 and 95, translates connecting rod 99 in a positive (+) direction as guided by guide flexures 100 and 101, and translates knife edges 22 and 23 in their positive (+) directions. The result is an increase in the width of optical slit 20 as knife edges 22 and 23 are shifted away from each other.

Conversely, a rotation of both eccentrics 32L and 32R via the motor in a negative (−) direction translates connecting rod 93 in a negative (−) direction as guided by guide flexures 94 and 95, translates connecting rod 99 in a negative (−) direction as guided by guide flexures 100 and 101, and translates knife edges 22 and 23 in their negative (−) directions. The result is a decrease in the width of optical slit 20 as knife edges 22 and 23 are shifted toward each other.

The width of optical slit 20 is a function of the dimensions of the eccentrics and the rotation of the encoded translators. In some embodiments, a calibration procedure will be needed to ensure an appropriate degree of accuracy in width and centerline location of the optical slit. Preferably, ledges 96 and 102 are dimensioned to cause the knife-edges, when installed, to be substantially parallel with each other. In an embodiment, a manual tilt adjustment of knife-edge 22 and/or 23 can be implemented to make the knife-edges more parallel. The guide flexures 94, 95, 100, and 101 should be dimensioned so that the knife-edges 22 and 23 remain parallel within both of their ranges of movements.

A second operation of frame assembly 90 involves a rotation of both eccentrics 32L and 32R in opposing directions. A rotation of left eccentric 32L in a positive (+) direction and right eccentric 32R in the negative (−) direction translates connecting rod 93 in a positive (+) direction as guided by guide flexures 94 and 95, translates connecting rod 99 in the negative (−) direction as guided by guide flexures 100 and 101, translates knife-edge 22 in a positive (+) direction, and translates knife-edge 23 in the negative (−) direction. The result is a shifting of the optical slit 20 toward the left side of frame assembly 90 as knife-edges 22 and 23 are both shifted toward the left side of frame assembly 90. This shifting of the slit can occur while maintaining a constant slit width, by appropriate control of the rotations of eccentrics 32R and 32L.

Figure 11:
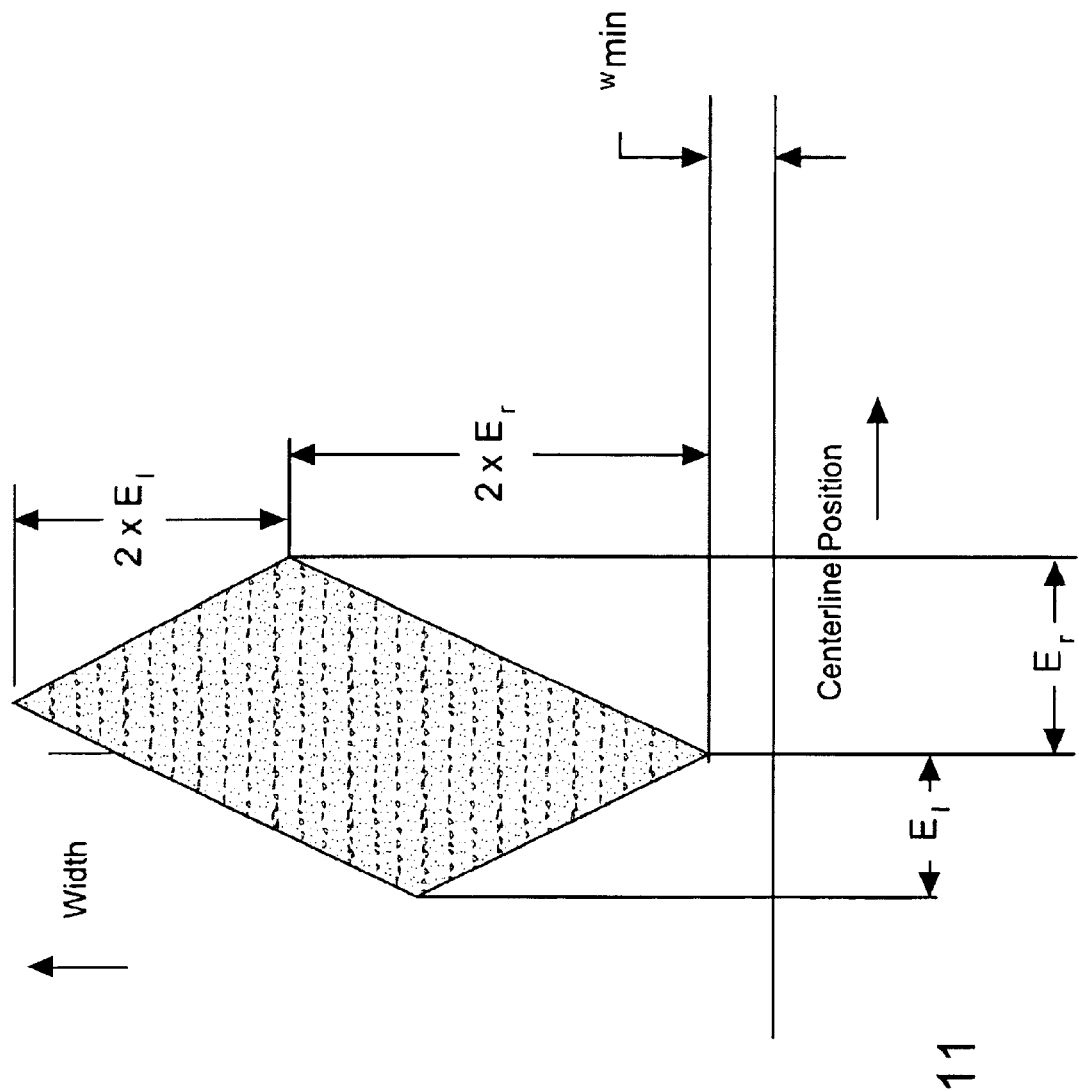
FIG. 11 illustrates a state space graph of the embodiments depicted in FIGS. 4, 6, and 7.

Conversely, rotation of left eccentric 32L in a negative (−) direction and right eccentric 32R in the positive (+) direction translates connecting rod 93 in a negative (−) direction as guided by guide flexures 94 and 95, translates connecting rod 99 in the positive (+) direction as guided by guide flexures 100 and 101, translates knife-edge 22 in a negative (−) direction, and translates knife-edge 23 in the positive (+) direction. The result is a shifting of the optical slit 20 toward the right side of frame assembly 90 as knife edges 22 and 23 are both shifted toward the right side of frame assembly 90. This shifting of the slit can occur while maintaining a constant slit width, by appropriate control of the rotations of eccentrics 32R and 32L. In general, the state space of width and centerline position is a diamond shape, as shown in FIG. 11. The minimum width $W_{min}$ is set by rotating eccentrics 32R and 32L (not shown in FIG. 11) such that the connecting rods 93 and 99 (not shown in FIG. 11) are fully translated in their negative (−) directions, then by doing a manual width and tilt adjustment of the knife-edges.

A third operation of frame assembly 90 involves an exclusive rotation of either left eccentric 32L or right eccentric 32R via the motor. An exclusive rotation of left eccentric 32L in a positive (+) direction translates connecting rod 93 in a positive (+) direction as guided by guide flexures 94 and 95, and translates knife-edge 22 in a positive (+) direction. The result is an increase in the width of optical slit 20 as knife-edge 22 is shifted away from knife-edge 23.

Conversely, a rotation of left eccentric 32L via the motor in a negative (−) direction translates connecting rod 93 in a negative (−) direction as guided by guide flexures 94 and 95, and translates knife-edge 22 in the negative (−) direction. The result is a decrease in the width of optical slit 20 as knife-edge 22 is shifted toward knife-edge 23.

Similarly, an exclusive rotation of right eccentric 32R in a positive (+) direction translates connecting rod 93 in a positive (+) direction as guided by guide flexures 94 and 95, and translates knife-edge 23 in a positive (+) direction. The result is an increase in the width of optical slit 20 as knife-edge 23 is shifted away from knife-edge 22.

Conversely, a rotation of right eccentric 32R via the motor in a negative (−) direction translates connecting rod 93 in a negative (−) direction as guided by guide flexures 94 and 95, and translates knife-edge 23 in the negative (−) direction. The result is a decrease in the width of optical slit 20 as knife-edge 23 is shifted toward knife-edge 22.

As shown above, those of ordinary skill in the art will readily appreciate that the entire range of motion is possible using the invention, because the knife-edges may operated singularly or in concert in order to move the knife-edges in parallel or opposition so as to create a slit of a desired width and/or location within the limits defined by the state space graph of FIG. 11.

Figure 5:
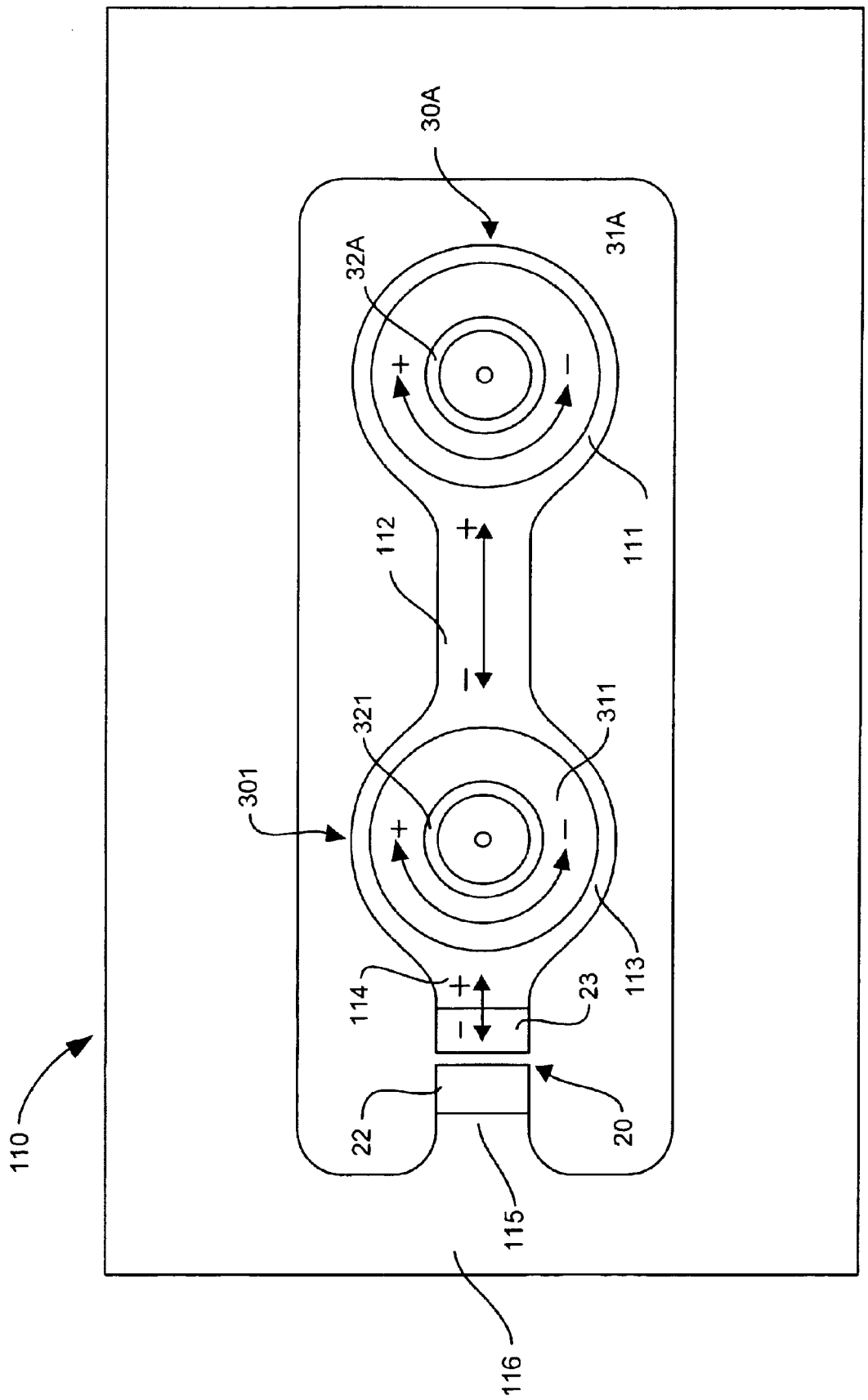
FIG. 5 illustrates a frame assembly constructed according to a fourth embodiment of the present invention.

FIG. 5 illustrates frame assembly 110 comprising an outer frame 116 and connecting rod 112. Connecting rod 112 has a bearing bore 111 conventionally receiving bearing assembly 31A of an active encoded translator 30A, and a bearing bore 113 conventionally receiving a bearing assembly 311 of idler assembly 301. Connecting rod 112 has ledge 114 attached to it. Knife-edge 23 is connected to a ledge 114, and knife-edge 22 is connected to a ledge 115 extending from outer frame 116. Again spatial positioning of knife-edges 22 and 23 constitutes a width of optical slit 20 for limiting the width of any optical beam propagating between knife-edges 22 and 23.

In operation, a rotation of an eccentric 32A via the motor in a positive (+) direction translates connecting rod 112 in a positive (+) direction as guided by idler assembly 301, and translates knife-edge 23 in a positive (+) direction. The result is an increase in the width of the optical slit as knife-edge 23 is shifted away from knife-edge 22.

Conversely, a rotation of an eccentric 32A via the motor in a negative (−) direction translates connecting rod 112 in a negative (−) direction as guided by idler assembly 301, and translates knife-edge 23 in a negative (−) direction. The result is a decrease in the width of the optical slit as knife-edge 23 is shifted toward knife-edge 22. In one embodiment, idler eccentric 321 has slightly higher eccentricity than the eccentricity of driven eccentric 32A. In another embodiment, a mechanical stop prevents the connecting rod 112 from binding when it is at the end of the range of motion in either positive or negative travel.

Figure 6:
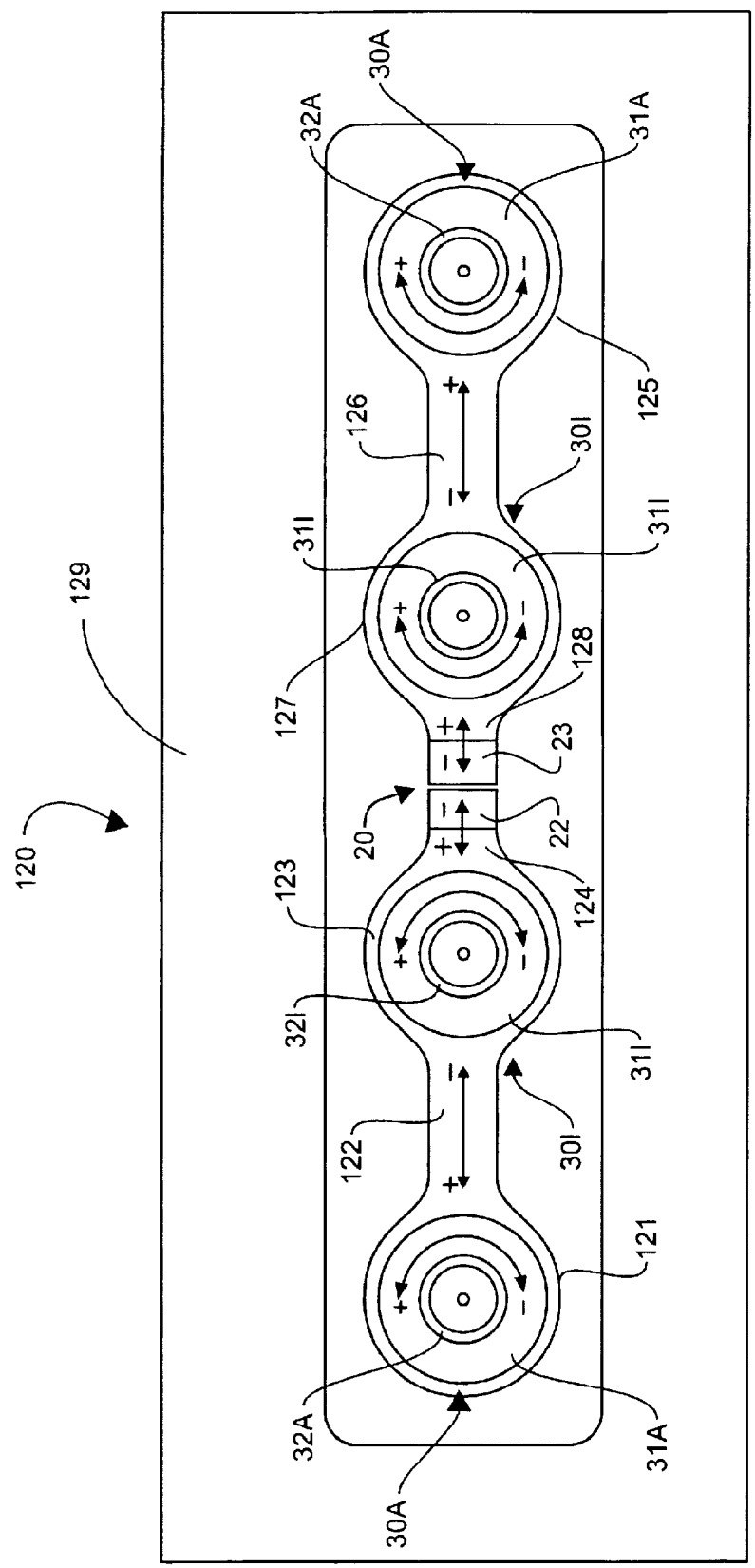
FIG. 6 illustrates a frame assembly constructed according to a fifth embodiment of the present invention.

FIG. 6 illustrates frame assembly 120 having a bearing bore 121 conventionally receiving bearing assembly 31A of an active encoded translator 30A, and a bearing bore 123 conventionally receiving a bearing assembly 311 of idler assembly 301. Bearing bores 121 and 123 connected to connecting rod 122. Bearing bore 123 is further connected to a ledge 124. Knife-edge 22 is connected to ledge 124.

Flexure frame assembly 120 further comprises a bearing bore 125 conventionally receiving bearing assembly 31A of an active encoded translator 30A, and a bearing bore 127 conventionally receiving a bearing assembly 311 of idler assembly 301. Bearing bores 125 and 127 connected to connecting rod 126. Bearing bore 127 is further connected to a ledge 128. Knife-edge 23 is connected to a ledge 128.

Again spatial positioning of knife-edges 22 and 23 constitutes a width of optical slit 20 for limiting the width of any optical beam propagating between knife-edges 22 and 23.

A first operation of frame assembly 120 involves a rotation of both eccentrics 32A in the same direction. A rotation of both eccentrics 32A via the motor in a positive (+) direction translates connecting rod 122 in a positive (+) direction as guided by idler eccentric 32I, translates connecting rod 126 in a positive (+) direction as guided by idler eccentric 32I, and translates knife edges 22 and 23 in a positive (+) direction. The result is an increase in the width of optical slit 20 as knife edges 22 and 23 are shifted away from each other.

Conversely, a rotation of both eccentrics 32A via the motor in a negative (−) direction translates connecting rod 122 in a negative (−) direction as guided by idler eccentric 32I, translates connecting rod 126 in a negative (−) direction as guided by idler eccentric 32I, and translates knife edges 22 and 23 in a negative (−) direction. The result is a decrease in the width of optical slit 20 as knife edges 22 and 23 are shifted toward each other.

Independent movement of the knife-edges allows the slit to be set to a range of widths within a range of centerline positions. A manual tilt adjustment of the knife-edges may be required if sufficient parallelism is not present.

A second operation of frame assembly 120 involves a rotation of eccentrics 32A in opposing directions. A rotation of left eccentric 32A in a positive (+) direction and right eccentric 32A in the negative (−) direction translates connecting rod 122 in a positive (+) direction, translates connecting rod 126 in the negative (−) direction, translates knife edge 22 in a positive (+) direction, and translates knife edge 23 in the negative (−) direction. The result is a shifting of optical slit 20 toward the left side of frame assembly 120 as knife edges 22 and 23 are both shifted toward the left side of frame assembly 120.

Conversely, rotation of left eccentric 32A in a negative (−) direction and right eccentric 32A in the positive (+) direction translates connecting rod 122 in a negative (−)direction, translates connecting rod 126 in the positive (+) direction, translates knife-edge 22 in a negative (−) direction, and translates knife-edge 23 in the positive (+) direction. The result is a shifting of optical slit 20 toward the right side of frame assembly 120 as knife-edges 22 and 23 are both shifted toward the right side of frame assembly 120.

A third operation of frame assembly 120 involves an exclusive rotation of either left eccentric 32A or right eccentric 32A via the motor. An exclusive rotation of left eccentric 32A in a positive (+) direction translates connecting rod 122 in a positive (+) direction, and translates knife-edge 22 in a positive (+) direction. The result is an increase in the width of optical slit 20 as knife-edge 22 is shifted away from knife-edge 23, and a shift in the centerline position of the slit.

Conversely, an exclusive rotation of left eccentric 32A via the motor in a negative (−) direction translates connecting rod 122 in a negative (−) direction, and translates knife-edge 22 in the negative (−) direction. The result is a decrease in the width of optical slit 20 as knife-edge 22 is shifted toward knife-edge 23, and a shift in the centerline position of the slit.

Similarly, an exclusive rotation of right eccentric 32A in a positive (+) direction translates connecting rod 126 in a positive (+) direction, and translates knife-edge 23 in a positive (+) direction. The result is an increase in the width of optical slit 20 as knife-edge 23 is shifted away from knife-edge 22, and a shift in the centerline position of the slit.

Those of ordinary skill in the art will readily appreciate that the eccentrics 32A are capable of rotating either independently or in concert with each other. This ability allows for the simultaneous selection of both width and location of the optical slit 20, within the limits defined by state space graph FIG. 13.

As shown above, those of ordinary skill in the art will readily appreciate that the entire range of motion is possible using the invention, because the knife-edges may operated singularly or in concert in order to move the knife-edges in parallel or opposition so as to create a slit of a desired width and/or location within the limits defined by the state space graph of FIG. 11.

Figure 7:
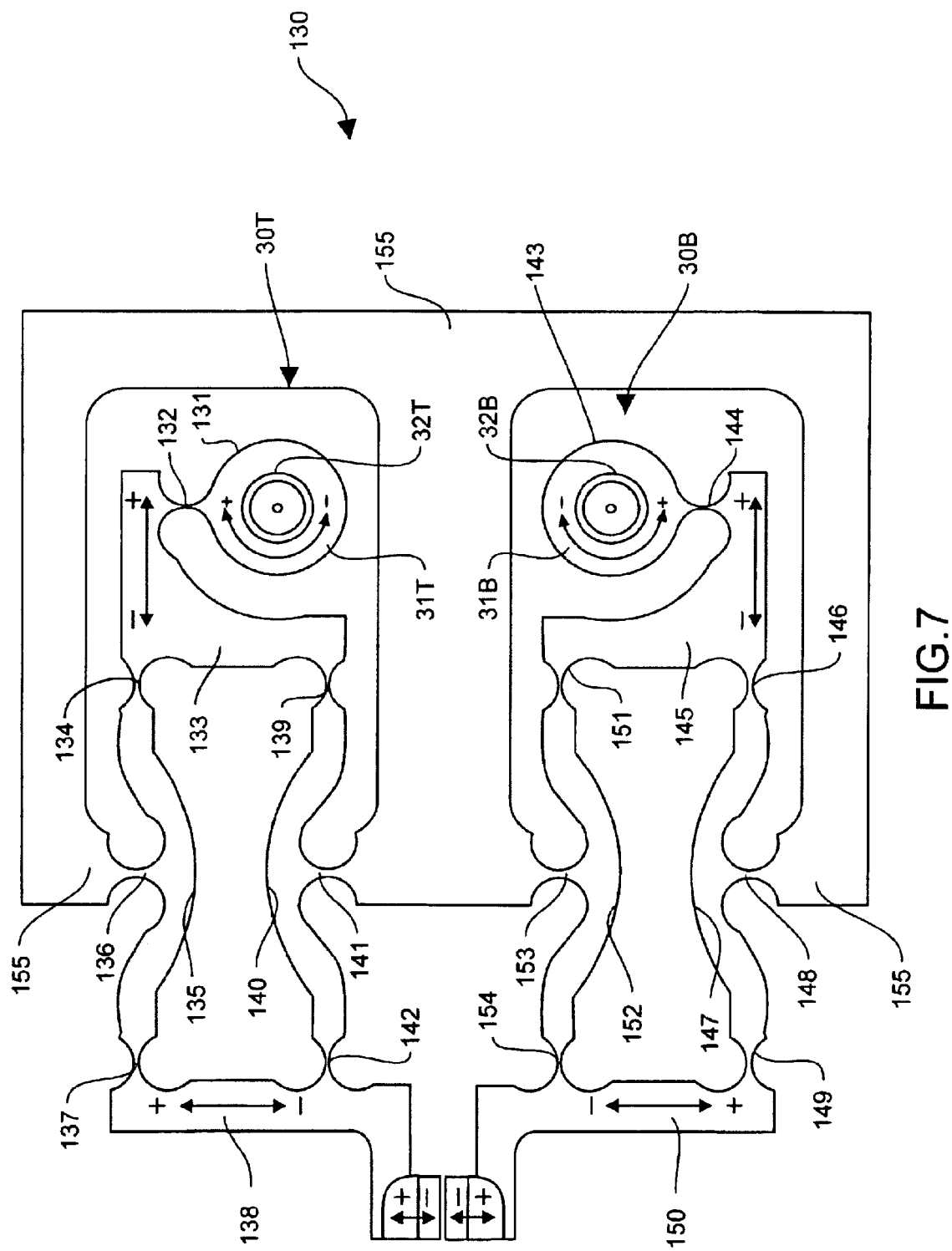
FIG. 7 illustrates a frame assembly constructed according to a sixth embodiment of the present invention.

FIG. 7 illustrates flexure frame assembly 130 having a bearing bore 131 conventionally receiving a bearing assembly 31T of top encoded translator 30T, and a bearing bore 143 conventionally receiving a bearing assembly 31B of bottom encoded translator 30B. Bearing bore 131 is connected to a link 133 via a right circular flexure 132. Link 133 is connected to a connecting rod 135 via a right circular flexure 134, and connected to a connecting rod 140 via a right circular flexure 139. Connecting rod 135 is also connected to a frame 155 via a right circular flexure 136, and connected to a slit connecting rod 138 via a right circular flexure 137. Connecting rod 140 is also connected to frame 155 via a right circular flexure 141, and connected to slit connecting rod 138 via a right circular flexure 142. The thinnest points of right circular flexures 137, 136, and 134 are collinear, as are the thinnest points of right circular flexures 142, 141, and 139.

Bearing bore 143 is connected to a link 145 via a right circular flexure 144. Link 145 is connected to a connecting rod 147 via a right circular flexure 146, and connected to a connecting rod 152 via a right circular flexure 151. Connecting rod 147 is also connected to frame 155 via a right circular flexure 148, and connected to a slit connecting rod 150 via a right circular flexure 149. Connecting rod 152 is also connected to frame 155 via a right circular flexure 153, and connected to slit connecting rod 150 via a right circular flexure 154. The thinnest points of right circular flexures 154, 153, and 151 are collinear, as are the thinnest points of right circular flexures 149, 148, and 146. Knife-edge 22 is affixed to slit connecting rod 138 and knife-edge 23 is connected to slit connecting rod 150. Again, a spatial positioning of knife-edges 22 and 23 constitutes a width of optical slit 20 for limiting the width of any optical beam propagating between knife-edges 22 and 23.

A first exemplary operation of frame assembly 130 involves a rotation of both eccentrics 32T and 32B in the same direction. A rotation of eccentric 32T via its encoded translator in a positive (+) direction translates link 133 in a positive (+) direction, which causes connecting rods 135 and 140 to pivot about right circular flexures 136 and 141 (respectively) in a clockwise direction, causing slit connecting rod 138 to translate in a positive (+) direction translating knife-edge 22 in a positive (+) direction. The rotation of eccentric 32B via its encoded translator in a positive (+) direction translates link 145 in a positive (+) direction, which causes connecting rods 147 and 152 to pivot about right circular flexures 147 and 153 (respectively) in a counterclockwise direction, causing slit connecting rod 150 to translate in a positive (+) direction, translating knife-edge 23 in a positive (+) direction. The result is an increase in the width of optical slit 20 as knife-edges 22 and 23 are shifted away from each other.

Conversely, a rotation of both eccentrics 32T and 32B via their encoded translators in their negative (−) directions translates arm 138 in a negative (−) direction, translates arm 150 in a negative (−) direction, and translates knife edges 22 and 23 in their negative (−) directions. The result is a decrease in the width of optical slit 20 as knife-edges 22 and 23 are shifted toward each other.

The width of optical slit 20 is a function of the dimensions of the eccentrics, the distances between the RC flexures, and the rotation of the encoded translators. In some embodiments, a calibration procedure will be needed to ensure an appropriate degree of accuracy in width and centerline location of the optical slit. Preferably, arms 138 and 150 are dimensioned to cause the knife-edges, when installed, to be acceptably parallel to each other. In practice, a manual tilt adjustment of knife-edge 22 and/or 23 can be implemented to make the knife-edges more parallel.

A second operation of frame assembly 130 involves a rotation of eccentrics 32T and 32B in opposing directions. A rotation of eccentric 32T in a positive (+) direction and eccentric 32B in the negative (−) direction translates arm 138 in a positive (+) direction, translates arm 150 in the negative (−) direction, translates knife edge 22 in a positive (+) direction, and translates knife edge 23 in the negative (−) direction. The result is a shifting of optical slit 20 upward as knife-edges 22 and 23 are both shifted upward.

Conversely, rotation of eccentric 32T in a negative (−) direction and eccentric 32B in the positive (+) direction translates arm 138 in a negative (−) direction, translates arm 150 in the positive (+) direction, translates knife edge 22 in a negative (−) direction, and translates knife edge 23 in the positive (+) direction. The result is a shifting of optical slit 20 downward as knife-edges 22 and 23 are both shifted downward.

A third operation of frame assembly 130 involves an exclusive rotation of eccentric 32T via its encoded translator. An exclusive rotation of eccentric 32T in a positive (+) direction translates arm 138 in a positive (+) direction, and translates knife-edge 22 in a positive (+) direction. The result is an increase in the width of optical slit 20 as knife-edge 22 is shifted away from knife-edge 23, and a shift in the centerline position of the slit.

Conversely, an exclusive rotation of eccentric 32T via its encoded translator in a negative(−) direction translates arm 138 in a negative (−) direction, and translates knife-edge 22 in the negative (−) direction. The result is a decrease in the width of optical slit 20 as knife-edge 22 is shifted toward knife-edge 23, and a shift in the centerline position of the slit.

Similarly, an exclusive rotation of eccentric 32B in a positive (+) direction translates arm 150 in a positive (+) direction, and translates knife-edge 23 in a positive (+) direction. The result is an increase in the width of optical slit 20 as knife-edge 23 is shifted away from knife-edge 22, and a shift in the centerline position of the slit.

Conversely, an exclusive rotation of eccentric 32B via its encoded translator in a negative (−) direction translates arm 150 in a negative (−) direction, and translates knife-edge 23 in the negative (−) direction. The result is a decrease in the width of optical slit 20 as knife-edge 23 is shifted toward knife-edge 22, and a shift in the centerline position of the slit.

The ratio of translation of knife-edge 22 to translation of link 133 can be chosen from among a wide range of values by adjustment of the ratios of distances between RC flexures 134–136, and 136–137 on connecting rod 135 and RC flexures 139–141, and 141–142 on connecting rod 140. These distances must be the same for each connecting rod in order to cause pure translation of knife-edge 22. The distances can be chosen in the same way for connecting rods 147 and 152, and must be matched in the same way.

As shown above, those of ordinary skill in the art will readily appreciate that the entire range of motion is possible using the invention, because the knife-edges may operated singularly or in concert in order to move the knife-edges in parallel or opposition so as to create a slit of a desired width and/or location within the limits defined by the state space graph of FIG. 11.

Figure 8:
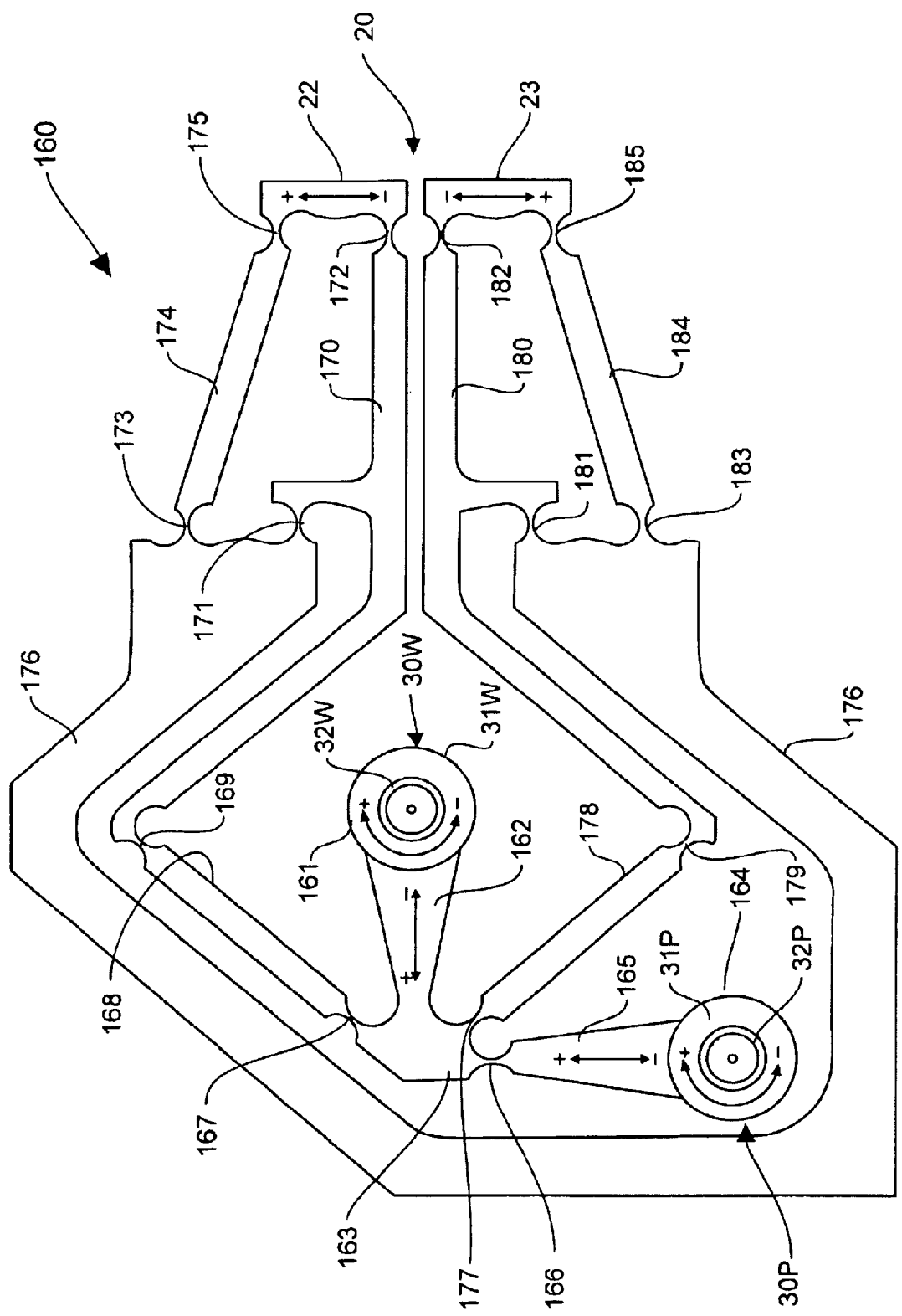
FIG. 8 illustrates a frame assembly constructed according to a seventh embodiment of the present invention.

FIG. 8 illustrates flexure frame assembly 160 having a bearing bore 161 conventionally receiving bearing assembly 31W of top encoded translator 30W, and a bearing bore 164 conventionally receiving a bearing assembly 31P of bottom encoded translator 30P. Bearing bore 161 is connected to a driven link 162, which is connected to a driven connecting rod 163. Bearing bore 164 is connected to a driven link 165, which is connected to driven connecting rod 163 via a right circular flexure 166.

A connecting rod 168 is connected to driven connecting rod 163 via a right circular flexure 167, and connected to a connecting rod 170 via a right circular flexure 169. Connecting rod 170 is also connected to a frame 176 via a right circular flexure 171, and connected to knife-edge 22 via a right circular flexure 172. A connecting rod 174 is connected to frame 176 via a right circular flexure 173 and connected to knife-edge 22 via a right circular flexure 175.

A connecting rod 178 is connected to driven connecting rod 163 via a right circular flexure 177, and connected to a connecting rod 180 via a right circular flexure 179. Connecting rod 180 is also connected to frame 176 via a right circular flexure 181, and connected to knife-edge 23 via a right circular flexure 182. A connecting rod 184 is connected to frame 176 via a right circular flexure 183 and connected to knife-edge 23 via a right circular flexure 185.

Again, a spatial positioning of knife-edges 22 and 23 constitutes a width of optical slit 20 for limiting the width of any optical beam propagating between knife-edges 22 and 23.

A first operation of frame assembly 160 involves a rotation of eccentric 32W. A rotation of eccentric 32W via its encoded translator in a positive (+) direction translates driven link 162 in a positive (+) direction, and translates knife-edges 22 and 23 in a positive (+) direction. The result is an increase in the width of optical slit 20 as knife edges 22 and 23 are shifted away from each other.

Conversely, a rotation of eccentric 32W via its encoded translator in a negative (−) direction translates driven link 162 in a negative (−) direction, and translates knife-edges 22 and 23 in a negative (−) direction. The result is a decrease in the width of optical slit 20 as knife edges 22 and 23 are shifted toward each other.

The symmetrical nature of the increase and the decrease in the width of optical slit 20 is a function of the symmetrical nature of connecting rods 170, 174 and connecting rods 180, 184 relative to optical slit 20. Preferably, connecting rods 170, 174 and connecting rods 180, 184 are dimensioned to allow for a symmetrical increase and a symmetrical decrease in the width of optical slit 20. Any asymmetry in the increase or decrease in width can be allowed for by rotation of the positioning motor. Connecting rods 170, 174 and connecting rods 180, 184 must also be dimensioned to give pure translation to knife-edges 22 and 23. In particular, the distance between RC flexures 174 and 175 should match the distances between flexures 171–172, 181–182, and 183–185. In addition, the dimensions of connecting rods 170, 174 and connecting rods 180, 184 can be chosen to vary the ratio of knife-edge translation to translation of connecting rod 163.

In practice, a manual tilt adjustment of knife-edges 22 and 23 can be implemented to overcome Parallelism errors due to manufacturing tolerances.

A second operation of frame assembly 160 involves a rotation of eccentric 32P. A rotation of eccentric 32P via the motor in a positive (+) direction translates driven link 165 in a positive (+) direction, translates knife edge 22 in a positive (+) direction, and translates knife-edge 23 in a negative (−) direction. The result is an upward shift in the position of optical slit 20 as knife-edges 22 and 23 are upwardly shifted.

Conversely, a rotation of eccentric 32P via the motor in a negative (−) direction translates driven link 165 in a negative (−) direction, translates knife-edge 22 in a negative (−) direction, and translates knife edge 23 in a positive (+) direction. The result is a downward shift in the position of optical slit 20 as knife-edges 22 and 23 are downwardly shifted.

Figure 12:
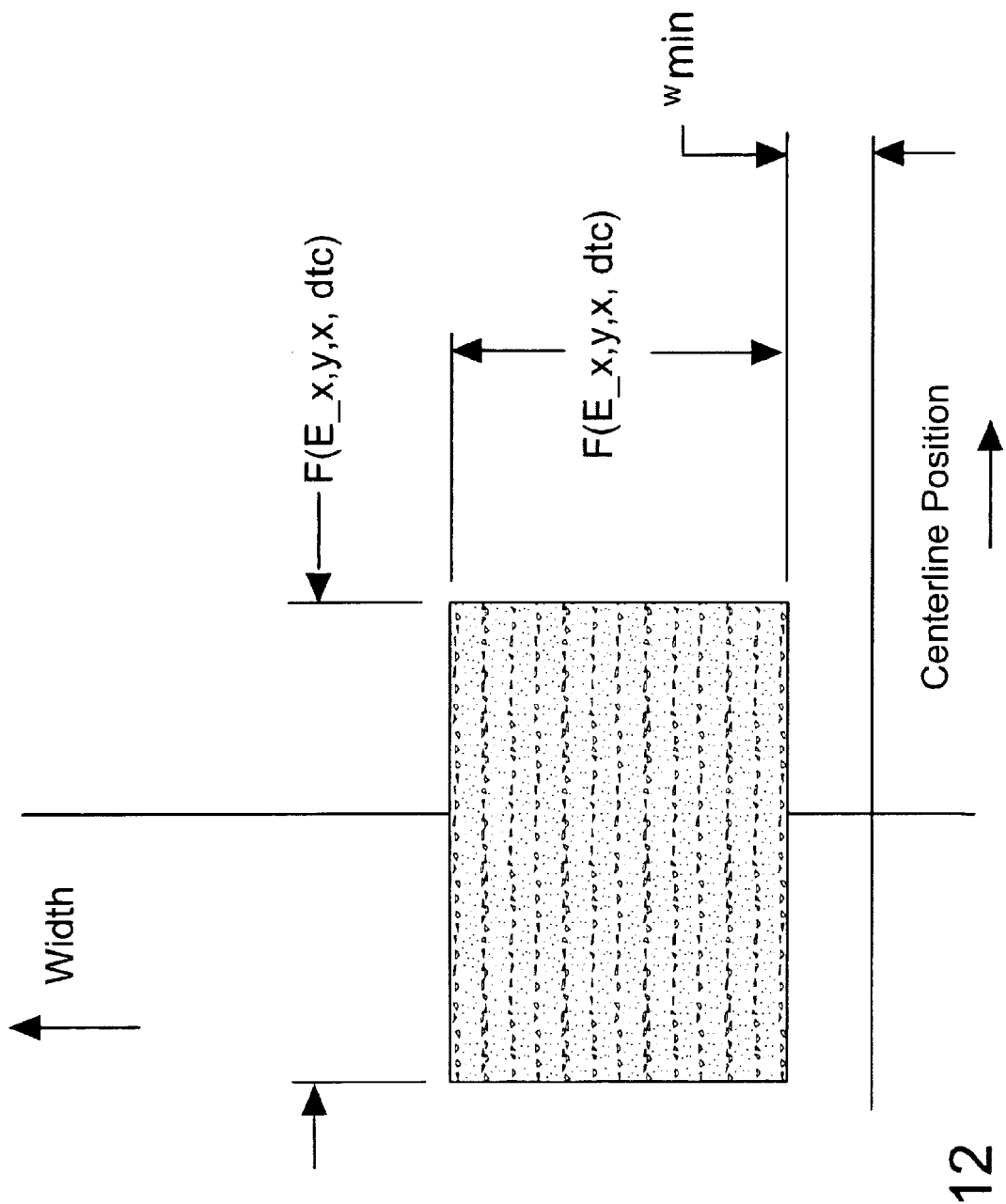
FIG. 12 illustrates a state space graph of the embodiments depicted in FIGS. 8 and 9.

In general, the state space of width and centerline position for the embodiment of FIG. 8 is a rectangular shape, as shown in FIG. 12. The minimum width $W_{min}$ is set by rotating eccentric 32W (not shown in FIG. 12) in its negative (−) direction such that the driven link 162 (not shown in FIG. 12) is fully translated in its negative (−) direction, then by doing a manual width and tilt adjustment of the knife-edges.

Figure 9:
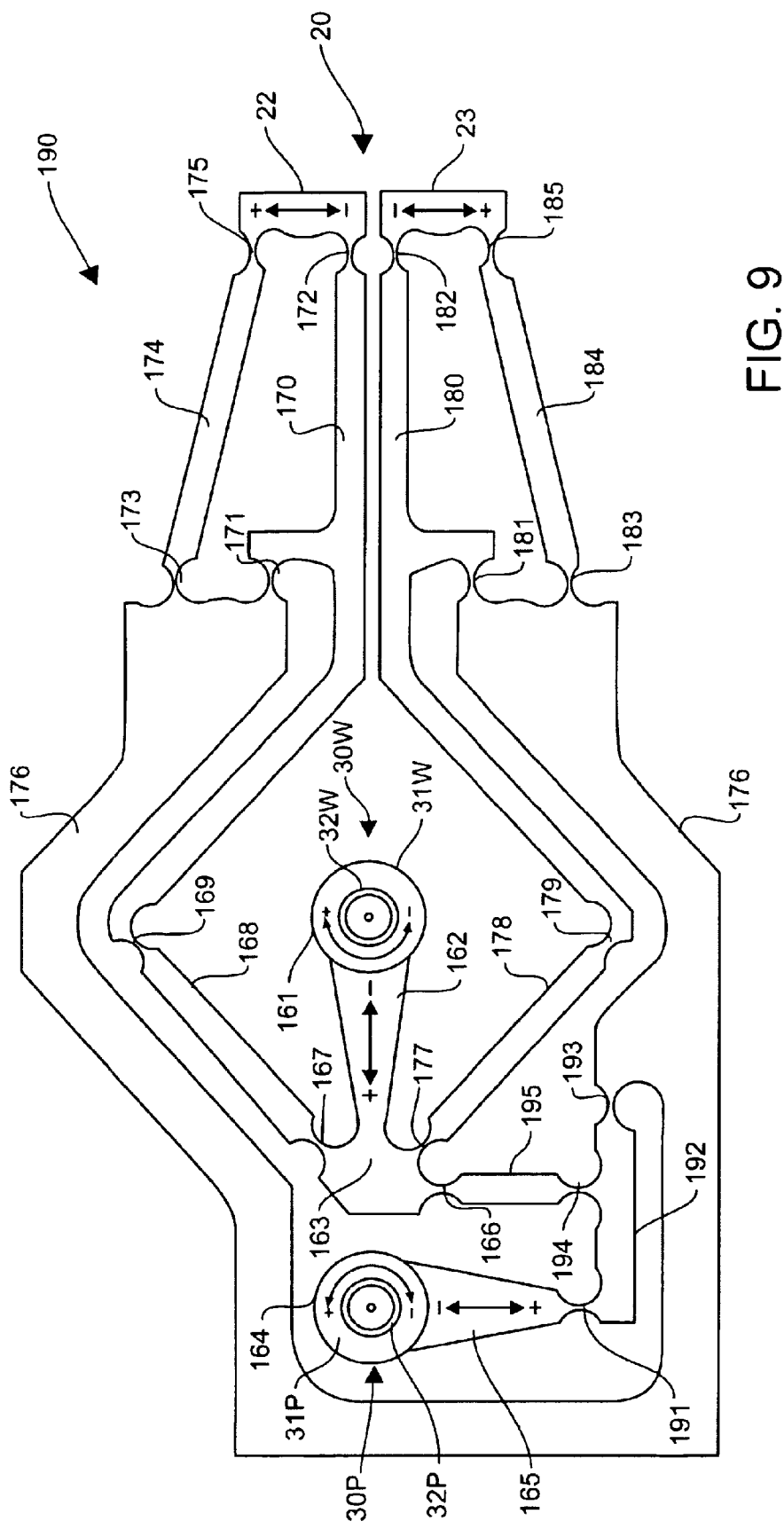
FIG. 9 illustrates a frame assembly constructed according to an eighth embodiment of the present invention.

FIG. 9 illustrates flexure frame assembly 190, comprising an alternative version of flexure frame assembly 160 (FIG. 8) with a difference being a coupling of driven connecting rod 165 to driven connecting rod 163. For assembly 190, a connecting rod 192 is connected to drive connecting rod 165 via a right circular flexure 191, connected to frame 176 via a right circular flexure 193, and connected to a connecting rod 195 via a right circular flexure 194. Connecting rod 195 is connected to driver connecting rod 163 via right circular flexure 166.

As with assembly 160 (FIG. 8), a first operation of frame assembly 190 involves a rotation of eccentric 32W. A rotation of eccentric 32W via its encoded translator in a positive (+) direction translates driven link 162 in a positive (+) direction, and translates knife-edges 22 and 23 in their positive (+) directions. The result is an increase in the width of optical slit 20 as knife-edges 22 and 23 are shifted away from each other.

Conversely, a rotation of eccentric 32W via its encoded translator in a negative (−) direction translates driven link 162 in a negative (−) direction, and translates knife-edges 22 and 23 in their negative (−) directions. The result is a decrease in the width of optical slit 20 as knife-edges 22 and 23 are shifted toward each other.

A second operation of frame assembly 190 involves a rotation of eccentric 32P. A rotation of eccentric 32P via its encoded translator in a positive (+) direction translates driven link 165 in a positive (+) direction, translates knife edges 22 in a positive (+) direction, and translates knife-edge 23 in a negative (−) direction. The result is an upward shift in the position of optical slit 20 as knife-edges 22 and 23 are upwardly shifted.

Conversely, a rotation of eccentric 32P via its encoded translator in a negative (−) direction translates driven link 162 in a negative (−) direction, translates knife-edge 22 in a negative (−) direction, and translates knife-edge 23 in a positive (+) direction. The result is a downward shift in the position of optical slit 20 as knife-edges 22 and 23 are downwardly shifted.

Connecting rod 192 can be dimensioned to provide a range of ratios between the size of eccentric 32P and the translation of slit 20.

In general, the state space of width and centerline position for the embodiment of FIG. 9 is a rectangular shape, as shown in FIG. 12. The minimum width $W_{min}$ is set by rotating eccentric 32W (not shown in FIG. 12) in its negative (−) direction such that the driven link 162 (not shown in FIG. 12) is fully translated in its negative (−) direction, then by doing a manual width and tilt adjustment of the knife-edges.

Figure 10:
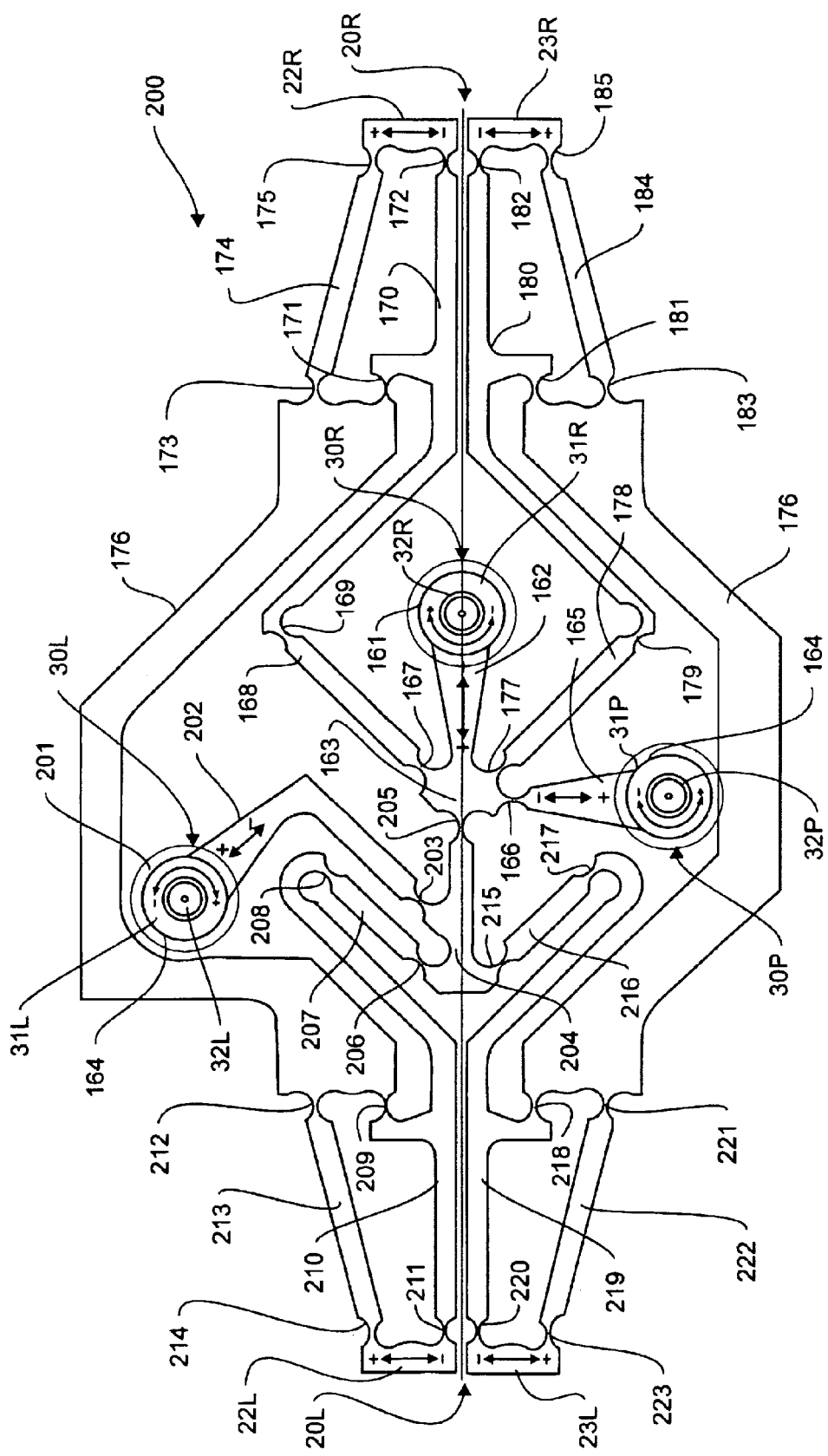
FIG. 10 illustrates a frame assembly constructed according to a ninth embodiment of the present invention.

FIG. 10 illustrates flexure frame assembly 200, comprising a double slit version of flexure frame assembly 160 (FIG. 8). For assembly 200, the additional components are a bearing bore 201 conventionally receiving bearing assembly 31L of an encoded translator 30L. Bearing bore 201 is connected to drive link 202, which is connected to connecting rod 204 via a right circular flexure 203. Connecting rod 204 is further connected to driver connecting rod 163 via a right circular flexure 205. A connecting rod 207 is connected to connecting rod 204 via right circular flexure 206, and connected to a connecting rod 210 via a right circular flexure 208. Connecting rod 210 is connected to a knife-edge 22L via a right circular flexure 211, and frame 176 via a right circular flexure 209. A connecting rod 213 is connected to knife-edge 22L via a right circular flexure 214, and frame 176 via a right circular flexure 212.

A connecting rod 216 is connected to connecting rod 204 via right circular flexure 215, and connected to a connecting rod 219 via a right circular flexure 217. Connecting rod 219 is connected to a knife-edge 23L via a right circular flexure 220, and frame 176 via a right circular flexure 218. A connecting rod 222 is connected to knife-edge 23L via a right circular flexure 223, and frame 176 via a right circular flexure 221.

As with assembly 160 (FIG. 8), a first operation of frame assembly 200 involves a rotation of eccentric 32W. A rotation of eccentric 32W via its encoded translator in a positive (+) direction translates driven link 162 in a positive (+) direction, and translates knife-edges 22R and 23R in a positive (+) direction. The result is an increase in the width of optical slit 20R as knife-edges 22R and 23R are shifted away from each other. In addition, a rotation of eccentric 32W via its encoded translator in a positive (+) direction translates connecting rod 204, which translates knife-edges 22L and 23L in a positive (+) direction. The result is an increase in the width of optical slit 20L as knife-edges 22L and 23L are shifted away from each other.

Conversely, a rotation of eccentric 32R via its encoded translator in a negative (−) direction translates driven link 162 in a negative (−) direction, and translates knife-edges 22R and 23R in a negative (−) direction. The result is a decrease in the widths of optical slits 20R and 20L as their associated knife-edges 22R and 23R, and 22L and 23L are shifted toward each other.

A second operation of frame assembly 200 involves a rotation of eccentric 32P. A rotation of eccentric 32P via its encoded translator in a positive (+) direction translates driven link 165 in a positive (+) direction, translates knife edges 23R and 22L in a positive (+) direction, and translates knife-edges 22R and 23L in a negative (−) direction. The result is a downward shift in the position of optical slit 20R as knife-edges 22R and 23R are downwardly shifted, and an upward shift in the width of optical slit 20L as knife edges 22L and 23L are upwardly shifted.

Conversely, a rotation of eccentric 32P via its encoded translator in a negative (−) direction knife-edge results in an upward shift of slit 20R and a downward shift of slit 20L.

A third operation of frame assembly 200 involves a rotation of eccentric 32L. A rotation of both eccentric 32L via its encoded translator in a positive (+) direction translates driven link 202 in a positive (+) direction, translates knife edge 23L in a positive (+) direction, and translates knife-edge 22L in a negative (−) direction. The result is a downward shift of slit 20L.

Conversely, a rotation of eccentric 32L via its encoded translator in a negative (−) direction translates slit 20L in an upward direction.

Connecting rods 213, 210, 219, and 222 are dimensioned so that distances between RC flexures 212–214 and 211–209 are the same, and distances between RC flexures 218–220 and 221–223 are the same. In this example, connecting rods 213, 210, 219, and 222 are dimensioned so that lines connecting RC flexures 212–214 and 211–209 are parallel, and lines connecting RC flexures 218–220 and 221–223 are parallel. This exemplary embodiment further features connecting rods 174, 170, 180, and 184 that are dimensioned so that a similar set of constraints are satisfied for RC flexures 173, 175, 171, 172, 181, 182, 183, and 185. Also, connecting rods 23, 210, 207, 168, 170, and 174 are symmetrical with respect to centerline 230 with connecting rods 222, 219, 216, 178, 180, and 184, respectively. Connecting rods 168 and 170 are dimensioned to provide a range of ratios between the size of eccentric 32W and the translation of knife-edge 22R. Similarly, connecting rods 178 and 180, 207 and 210, and 216 and 219 are dimensioned to provide a range of ratios between the size of eccentric 32W and translations of knife-edges 23R, 22L, and 23L, respectively. Connecting rod 204 is dimensioned to provide a range of ratios between the size of eccentric 32L and the translation of slit 20L.

In this example, a manual tilt adjustment of knife-edges 22L and 22R with respect to 23L and 23R, respectively, may be required to overcome the effects of manufacturing tolerances and provide parallel knife-edges, if the manufacturing process results in an insufficient degree of parallelism.

Figure 13:
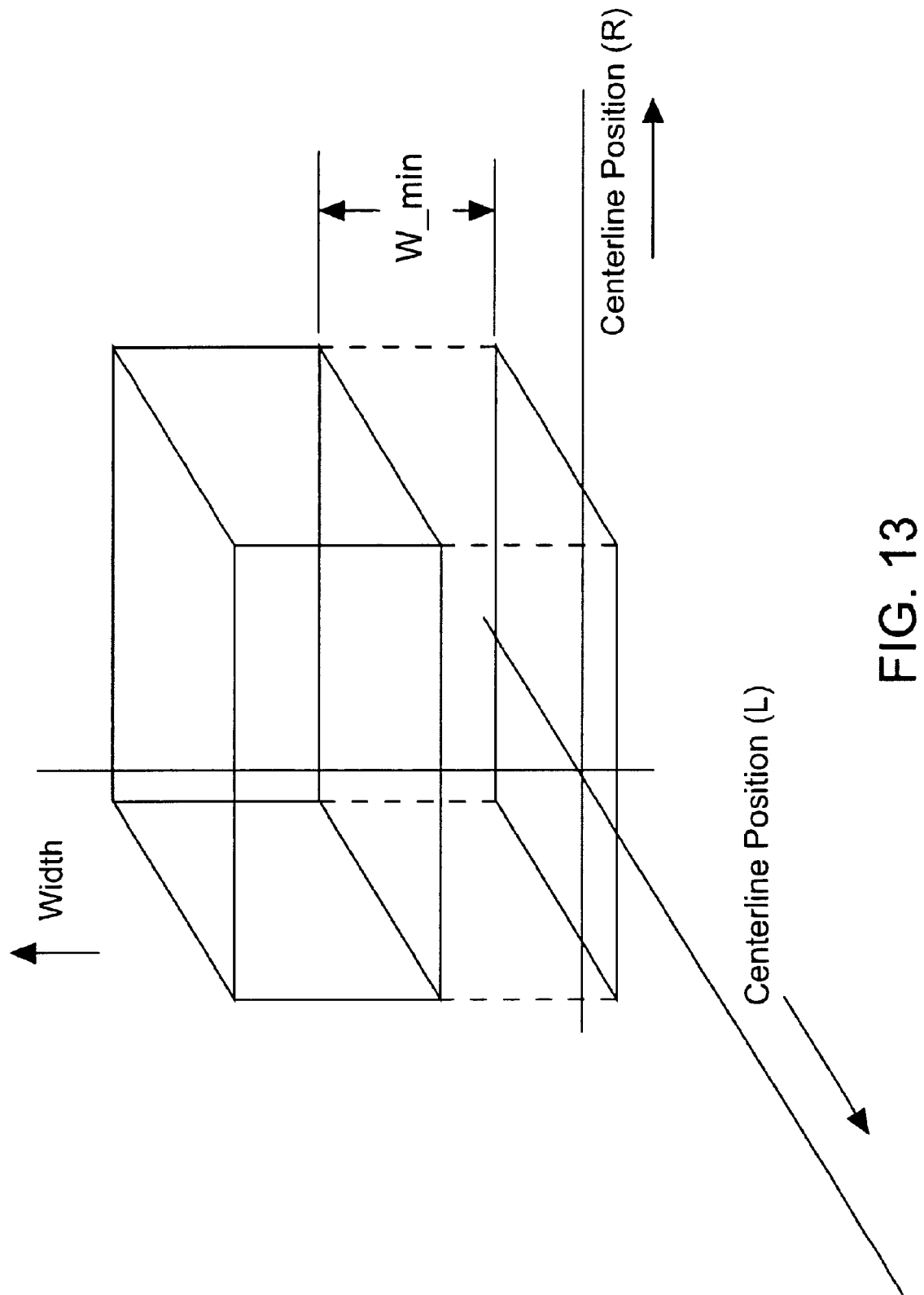
FIG. 13 illustrates a state space graph of the embodiment depicted in FIG. 10.

In general, the state space of width and centerline position for the embodiment of FIG. 10 is a cube shape, as shown in FIG. 13. The minimum width $W_{min}$ is set by rotating eccentric 32W (not shown in FIG. 13) in its negative (−) direction such that driver connecting rod 163 (not shown in FIG. 13) is fully translated in its negative (−) direction, then by doing a manual width and tilt adjustment of the knife-edges.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A variable optical slit assembly, comprising:

a first encoded translator;

an optical slit limiting the width of any optical beam propagating through said optical slit; and a frame assembly operatively coupling said first encoded translator to said optical slit, wherein any rotation of said first encoded translator alters the width of said optical slit.

2. The variable optical slit assembly of claim 1, wherein said optical slit includes a first knife-edge and a second knife edge; and wherein a distance between said first knife-edge and said second knife-edge constitute a width of said optical slit, for limiting the width of any optical beam propagating between said first knife-edge and said second knife edge.

3. The variable optical slit assembly of claim 2, wherein a rotation of said first encoded translator in a first direction increase the width of said optical slit, and wherein a rotation of said first encoded translator in a second direction decreases the width of said optical slit.

4. The variable optical slit assembly of claim 2, wherein a rotation of said first encoded translator in a first direction shifts said first knife edge away from said second knife edge; and wherein a rotation of said first encoded translator in a second direction shifts said first knife edge toward said second knife edge.

5. The variable optical slit assembly of claim 2, wherein a rotation of said first encoded translator in a first direction shifts said first knife-edge and said second knife edge away from each other; and wherein a rotation of said first encoded translator in a second direction shifts said first knife-edge and said second knife-edge toward each other.

6. The variable optical slit assembly of claim 2, wherein a rotation of said first encoded translator in a first direction shifts said first knife-edge and said second knife-edge in a second direction; and wherein a rotation of said first encoded translator in a third direction shifts said first knife-edge and said second knife-edge in a fourth direction.

7. The variable optical slit assembly of claim 2, wherein said frame assembly includes means for operatively coupling said first encoded translator to said first knife edge.

8. The variable optical slit assembly of claim 2, wherein said frame assembly includes means for operatively coupling said first encoded translator to both said first knife-edge and said second knife-edge.

9. The variable optical slit assembly of claim 2, further comprising a second encoded translator, and wherein said frame assembly includes means for operatively coupling said first encoded translator to said first knife-edge and operatively coupling said second encoded translator to said second knife edge.

10. The variable optical slit assembly of claim 2, further comprising a second encoded translator; and wherein said frame assembly includes means for operatively coupling both said first encoded translator and said second encoded translator to said first knife edge.

11. The variable optical slit assembly of claim 2, further comprising a second encoded translator; and wherein said frame assembly includes means for operatively coupling both said first encoded translator and said second encoded translator to both said first knife-edge and said second knife-edge.

12. The variable optical slit assembly of claim 2, further comprising an idler translator; and wherein said frame assembly includes means for operatively coupling both said first encoded translator and said idler translator to said first knife edge.

13. The variable optical slit assembly of claim 2, further comprising an idler translator; and wherein said frame assembly includes means for operatively coupling both said first encoded translator and said idler translator to both said first knife-edge and said second knife-edge.

* * * * *